United States Patent [19]
Schag et al.

[11] Patent Number: 5,677,520
[45] Date of Patent: Oct. 14, 1997

[54] ROTARY VACUUM ELECTRIC SWITCH

[75] Inventors: Michael R. Schag, Schaumburg; Ryszard A. Wojcik, Morton Grove, both of Ill.

[73] Assignee: Indak Manufacturing Corp., Northbrook, Ill.

[21] Appl. No.: 419,375

[22] Filed: Apr. 10, 1995

[51] Int. Cl.⁶ ................................................. H01H 9/06
[52] U.S. Cl. ........................................................ 200/61.86
[58] Field of Search ............................ 137/624.18, 625, 137/625.11; 200/11 R, 11 A, 11 G, 11 J, 16 R, 16 A, 16 C, 17 R, 18, 61.85, 61.86, 624.18

[56] References Cited

U.S. PATENT DOCUMENTS

| | | | |
|---|---|---|---|
| 4,679,588 | 7/1987 | Raab et al. | 137/560 |
| 4,892,984 | 1/1990 | Clark et al. | 200/61.86 |
| 5,406,041 | 4/1995 | Hahn et al. | 200/61.86 |
| 5,495,868 | 3/1996 | Cummings | 137/315 |

*Primary Examiner*—Michael L. Gellner
*Assistant Examiner*—Michael A. Friedhofer
*Attorney, Agent, or Firm*—Palmatier & Zummer

[57] ABSTRACT

The switch comprises a casing with a shaft rotatable therein and an insulating carriage rotatable with the shaft. A contactor is mounted on and rotatable with the carriage to a central OFF position and a series of circuit closing positions spaced both clockwise and counterclockwise therefrom. The contactor is engagable with fixed contacts mounted on an insulating terminal head. A vacuum valve is operable by a cam rotatable with the contactor. The valve includes stationary and moveable valve members. The stationary valve member has a vacuum source port and a vacuum utilization port. A third port is also provided. The movable valve member is moveable along a slideway on the stationary valve member. An elastomeric sealing member is received in a recess in the slideway and is formed with portions connected to the source and utilization ports. The moveable valve member has a valve surface which is slidable along the sealing member between first and second positions. The valve surface includes port structures for connecting the utilization port to the source port in the first position of the moveable valve member, while connecting the utilization port to the third port in the second position of the moveable valve member. As disclosed, the third port communicates with the atmosphere. The cam has portions for moving the moveable valve member between its first and second positions in both directions, and other portions for locking the valve member against unwanted movement in various positions of the cam. The cam coordinates the operation of the moveable valve member with the operation of the contactor.

16 Claims, 6 Drawing Sheets

| MODE SELECTOR VACUUM SWITCH | | | | | | | | | | |
|---|---|---|---|---|---|---|---|---|---|---|
| PORT | FUNCTION | DETENT POSITION | | | | | | | | |
| | | CCW-AC | | | | | CW-HT | | | |
| | | HI | MED | LO | AUX | OFF | AUX | LO | MED | HI |
| 63 | PANEL FLOOR | V | V | V | V | V OR A | A | A | A | A |
| 64 | SOURCE | V | V | V | V | V | V | V | V | V |

V=VACUUM, A=ATMOSPHERE

FIG. 14

| POSITION (CW AND CCW) | CIRCUIT MAKE | AMP |
|---|---|---|
| OFF | 41 | D |
| AUX | 41 + 42 | 0.35 |
| LO | 41 + 43 | 10 |
| MED | 41 + 44 | 20 |
| HI | 41 + 45 | 30 |

ROTARY VACUUM ELECTRIC SWITCH

FIELD OF THE INVENTION

This invention relates to combined vacuum and electrical switching devices having various applications, but intended especially for automotive service to control the speed of a blower and the direction of air flow in an automotive heating, ventilating and air conditioning system.

BACKGROUND OF THE INVENTION

Certain rotary vacuum electric switches for automotive service are known in the prior art. For example, a ROTARY VACUUM ELECTRIC SWITCH is disclosed in the Cummings U.S. Pat. No. 5,290,980, issued Mar. 1, 1994 to Indak Manufacturing Corp., the assignee of the present application. The switch disclosed in such patent is adapted to perform various electrical and vacuum switching functions in an automotive heating, ventilating and air conditioning system, to switch between heating and air conditioning modes and to control the direction of air flow to floor vents panel vents and defrosting vents.

SUMMARY OF THE INVENTION

The rotary vacuum electric switch disclosed herein as an illustrative embodiment of the present invention is adapted to be used as an auxiliary blower switch which is intended to be mounted near the operator of an automotive vehicle. The switch supplies a vacuum signal to control a vacuum operated mode door whereby the flow of air is switched between floor vents for a heating mode and panel vents for an air conditioning mode. The switch also controls the speed of an auxiliary blower motor for operating an auxiliary blower, located elsewhere in the vehicle. The vacuum electric switch is adapted to be used in conjunction with a second remote multi-position blower switch located near the rear output of the air duct system. The second switch is connected to the front mounted vacuum electric switch and may be operated by a passenger to control the blower speed when enabled to do so by the front mounted vacuum electric switch. However, the mode door is exclusively under the control of the front mounted vacuum electric switch.

The vacuum electric switch comprises a rotary shaft which is rotatable both clockwise and counterclockwise from a central OFF position to positions designated AUX, LOW, MEDIUM, and HIGH. In both AUX positions the remote auxiliary blower speed control switch is enabled and is operative to control the speed of the blower. In the LOW, MEDIUM, and HIGH positions, the vacuum electric switch overrides the remote rear mounted switch, so that the rear mounted switch loses control over the auxiliary blower motor.

A vacuum signal is supplied by the vacuum electric switch for all positions thereof in one direction of rotation so that air is directed to the panel vents for the air conditioning mode of operation. When the vacuum electric switch is operated in the opposite direction of rotation, an atmosphere signal is supplied so that the air is directed to the floor vents for the heating mode of operation.

One object of the present invention is to provide a rotary vacuum electric switch having a new and improved vacuum valve and new and improved means for coordinating the operation of the valve with the rotary operation of the switch. A further object is to provide a new and improved vacuum valve having a stationary elastomeric sealing member, affording stationary valve ports, and a moveable valve member having a valve surface slidably engaging the sealing member and affording moveable port means for producing valving functions.

To accomplish these and other objects, the present invention preferably provides a vacuum switch comprising a casing having a casing member, means forming a slideway on the casing member, the slideway having a recess therein, at least a vacuum passage and a utilization passage formed in the casing member and communicating with the recess, a soft resilient sealing member received in the recess and having a vacuum port in communication with the vacuum passage, the sealing member having a utilization port connecting with the utilization passage, a moveable valve member slidably received on the slideway and having a valve surface in a slidable sealing engagement with the sealing member, means forming a third port, the moveable valve member being moveable between at least first and second positions, and port means in the valve surface for connecting the utilization port to the vacuum port when the moveable valve member is in its first position while connecting the utilization port to the third port when the moveable valve member is in its second position. In the illustrative embodiment, the third port communicates with the atmosphere.

The vacuum switch also preferably comprises a shaft rotatably mounted in the casing, and a cam rotatable with the shaft between at least first and second angular positions for causing movement of the moveable member between its first and second positions. The cam preferably comprises means for causing movement of the moveable valve member between its first and second positions when the cam is rotated between its first and second angular positions, the cam comprising means for causing movement of the moveable valve member between the second and first positions thereof when the cam is rotated in the opposite direction between its second and first angular positions.

The cam also preferably comprises means for locking the moveable valve member in its first position when the cam is in its first angular position, the cam comprising means for locking the moveable valve member in its second position when the cam is in its second angular position.

The cam is preferably rotatable beyond its first and second angular positions in opposite angular directions therefrom, the cam preferably comprising means for locking the moveable valve member when the cam is moved beyond is first and second angular positions.

The cam preferably comprises a first generally radial shoulder for causing movement of the moveable valve member between its first and second positions when the cam is rotated between its first and second angular positions, the cam comprising a second generally radial shoulder for causing movement of the moveable valve member between its second and first positions when the cam is rotated between its second and first angular positions.

The vacuum switch preferably comprises means in said casing for supporting said shaft and said cam for angular movement in opposite angular directions beyond the first and second angular positions, the cam comprising means for locking the moveable valve member when the cam is in the first angular position and also when the cam is rotated beyond the first angular position, the cam comprising means for locking the moveable valve member when the cam is in the second angular position and also when the cam is rotated beyond the second angular position.

The cam preferably comprises generally circular means for locking the moveable valve member when the cam is in the first angular position and also when the cam is moveable beyond the first angular position, the cam also comprising generally circular means for locking the moveable valve member when the cam is in the second angular position and also when the cam is rotated beyond the second angular position.

In another aspect, the invention preferably provides a vacuum switch, comprising a casing member having a slideway thereon, the slideway having a recess therein, the casing member having at least a vacuum terminal member and a utilization terminal member thereon, the vacuum terminal member having a vacuum passage therein communicating with the recess, the utilization terminal member having a utilization passage therein communicating with the recess and spaced from the vacuum passage, a soft resilient sealing member received in the recess and having a vacuum port therein communicating with the vacuum passage, the sealing member having a utilization port therein communicating with the utilization passage, a moveable valve member slidably received on the slideway and having a valve surface in a slidable sealing engagement with the sealing member, means forming a third port, the valve member being moveable between first and second positions, the valve surface having port means therein and for connecting the utilization port to the vacuum port when the valve member is in its first position for connecting the utilization port to the third port when the valve member is in its second position, the valve surface having means for sealing the vacuum port when the valve member is in its second position.

The sealing member is preferably formed with sealing flange means extending around the vacuum port and the utilization port, the flange means including a partition flange element between the vacuum port and the utilization port. The port means in said valve surface should preferably be constructed and arranged to afford communication across the partition flange element when the valve member is in the first position thereof.

In another aspect, the present invention preferably provides an automotive vacuum electric switch, comprising a casing, a shaft rotatable in the casing, an insulating carriage mounted on the shaft and rotatable therewith, an electrically conductive contactor mounted on the carriage and rotatable therewith to a series of angularly spaced switching positions including an OFF position and a series of circuit closing positions spaced clockwise at angular intervals from the OFF position, the contactor being rotatable to additional circuit closing positions spaced counterclockwise at angular intervals from the OFF position, an insulating terminal head mounted on the casing opposite the contactor, the contactor having a first moveable contact for slidably engaging the terminal head, the terminal head having an insulating OFF position engagable by the first moveable contact in the OFF position of the contactor, a plurality of clockwise fixed contacts mounted on the terminal head and spaced clockwise at angular intervals from the OFF position, a series of counterclockwise fixed contacts mounted on the terminal head and spaced counterclockwise at angular intervals from the OFF position, the moveable contact being engagable with the clockwise fixed contacts in its successive clockwise circuit closing positions, the moveable contact being engagable with the successive counterclockwise fixed contacts in the counterclockwise circuit closing positions, the contactor having at least a second moveable contact thereon, an additional electrically conductive fixed contact mounted on the terminal head and slidably engagable by the second moveable contact in all of said clockwise and counterclockwise circuit closing positions of the contactor, a vacuum valve including a stationary valve member on the terminal head and having at least a vacuum source port and a vacuum utilization port therein, a soft resilient stationary sealing member mounted on the valve member and having portions connected to the source port and the utilization port, the valve member having a slideway formed thereon, the sealing member being mounted along the slideway, a valve slide member slidable along the slideway and having a valve surface for slidably engaging the sealing member, means forming a third port, the valve slide member being slidably moveable between at least first and second positions, the valve surface having port means thereon for connecting the utilization port to the vacuum source port in the first position and for connecting the utilization port to the third port in the second position of the valve slide member, and a valve actuating cam mounted on the carriage and rotatable therewith, the cam having valve operating means thereon for causing movement of the valve slide member in one direction between its first and second positions in response to rotation of the carriage and the contactor from the OFF position thereof in one direction of rotation, the cam having additional valve operating means for moving the valve slide member in the opposite direction between the second and first positions thereof in response to rotation of the carriage and the contactor from the OFF position thereof in the opposite direction of rotation.

The cam preferably includes means for retaining the valve slide member in its first position for all positions of the contactor displaced in said one direction from the OFF position thereof, the cam having means for retaining the valve slide member in its second position for all positions of the contactor displaced in the opposite direction of rotation from the OFF position thereof.

BRIEF DESCRIPTION OF THE DRAWINGS

Further objects, advantages and features of the present invention will appear from the following description, taken with the accompanying drawings in which.

DETAILED DESCRIPTION OF AN ILLUSTRATIVE EMBODIMENT

As just indicated, FIGS. 1–6 illustrate the rotary vacuum electric switch 20 to be described as an illustrative embodiment of the present invention. The switch 20 comprises a hollow generally rectangular casing 22 which encloses most of the moveable components of the switch 20. The casing 22 is preferably molded in one piece and is made of a suitable resinous plastic material. The casing 22 is open at the rear but is adapted to be closed by a rear casing member or terminal head 24, also molded in one piece of a resinous plastic material having good electrical insulating characteristics. The terminal head 24 is secured to the casing 22 by conventional snap fastening means which need not be described herein, so that the terminal head 24 can be assembled with the casing 22 by simply pushing the terminal head 24 forwardly into the casing 22.

The rotary vacuum electric switch 20 is adapted to be operated by rotating a generally cylindrical control shaft 26, preferably made of metal, which is rotatably received in the casing 22 so that the shaft projects forwardly therefrom. More specifically, the casing 22 has a front wall 28 formed with a generally cylindrical bearing member or boss 30 through which a cylindrical opening or bore 32 is axially formed. The shaft 26 has a front portion 34 which projects forwardly through the axial bore 32. In this case, the entire shaft 26 is non-circular in cross section and is formed with a flat longitudinal surface 36 for coupling the front portion 34 to a knob (not shown) which is employed to rotate the shaft 26.

This particular switch 20 is provided with five electrical terminals or prongs 41, 42, 43, 44 and 45 which project rearwardly from the terminal head 24 and are securely mounted in corresponding slots 51, 52, 53, 54 and 55, formed in the terminal head 24. The terminals 41–45 are preferably made of tin coated copper or some other electrically conductive metal. The terminals 41–45 are adapted to receive an electrical connector or receptacle (not shown).

The terminal head 24 is formed with first and second rearwardly projecting vacuum terminals or terminal members 61 and 62 which are illustrated as being nipple shaped and are molded in one piece with the terminal head 24. The vacuum terminals 61 and 62 are hollow and are formed with respective first and second passages or ports 63 and 64 therein. The vacuum terminals 61 and 62 are adapted to receive a vacuum connector (not shown) which may be mounted on the ends of tubes connected to a vacuum source and a vacuum utilization device, such as a vacuum motor for operating a door in the air duct system of the vehicle.

In this case, the second vacuum terminal 62 and the second passage or port 64 are adapted to be connected to the vacuum source, which may be the air intake manifold of the engine of the automotive vehicle. The first vacuum terminal 61 and the first passage or port 63 are adapted to be connected to the vacuum utilization device. Consequently, the first and second passages or ports 63 and 64 will sometime be referred to as the vacuum utilization passage or port and the vacuum source passage or port, respectively. As will be described in detail presently, the vacuum electric switch 20 includes a vacuum valve or switch for selectively connecting the vacuum utilization passage or port 63 to the vacuum source passage or port 64, in some positions of the rotary shaft 26, while connecting the utilization passage or port 63 to the atmosphere in other positions of the shaft.

Figure 5:
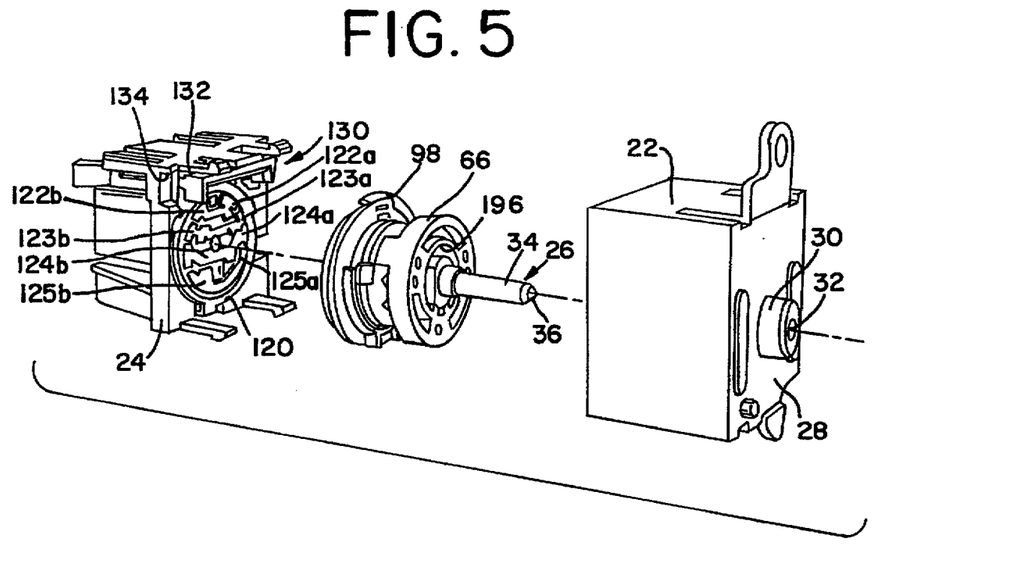
FIG. 5 is an exploded perspective view of the switch in a partially disassembled condition.
Figure 6:
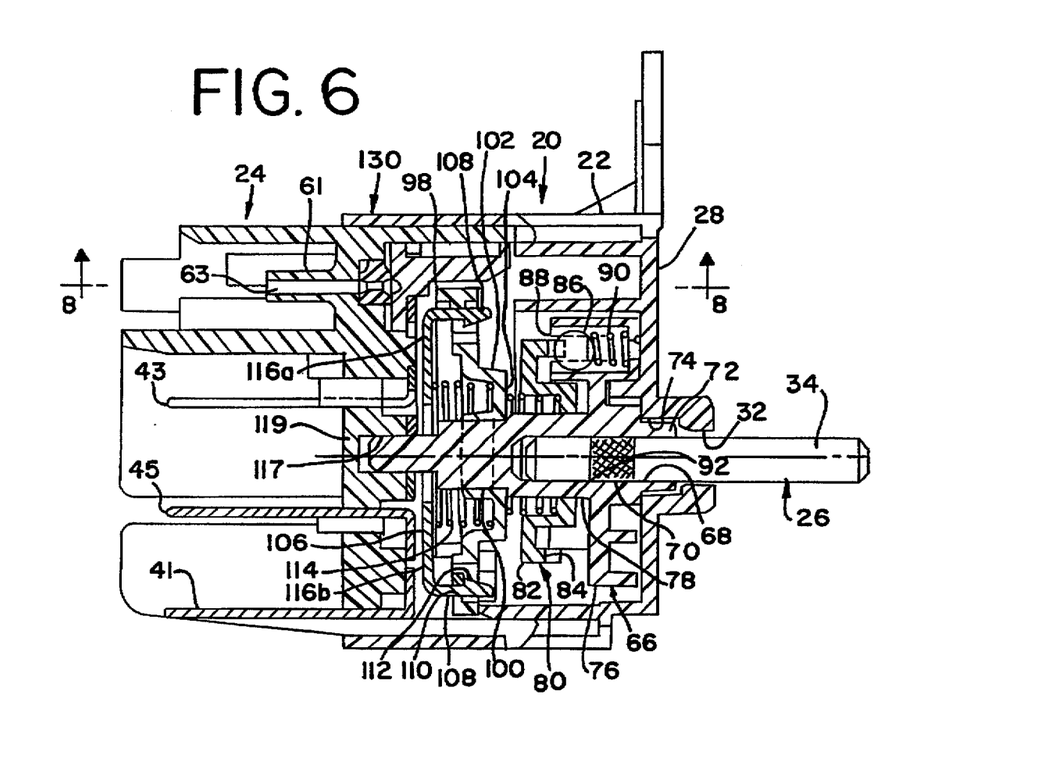
FIG. 6 is a central longitudinal sectional view of the switch, taken generally as indicated by the line 6—6 in FIG. 4.

As shown in FIGS. 5 and 6, the rear portion of the shaft 26 is solidly connected to a carriage 66 which is rotatable with the shaft 26 and is formed with a non-circular opening 68 for tightly receiving the rear portion of the shaft 26. The carriage 66 is preferably molded in one piece of a suitable resinous plastic material. As shown in FIG. 6, the rear portion of the shaft 26 has a knurled portion 70 which must be forcibly pressed into the non-circular opening 68, so that the shaft 26 will be solidly and permanently joined to the carriage 66.

The front of the carriage 66 is formed with an axial stub shaft or cylindrical boss 72 which is rotatably journaled in an enlarged cylindrical bearing portion 74 of the bore 32 in the front wall 28 of the casing 22.

The illustrated carriage 66 has a front portion 76 which is generally in the form of a cylindrical disk. The front portion 76 slidably engages the front wall 28 of the casing 22. An axial shaft extension 78 projects rearwardly from the front portion 76 of the carriage 66. Detent means 80 are provided for detaining the rotatable carriage 66 in a plurality of angularly spaced switching positions. The illustrated switch 20 has nine switching positions, but the number can be varied. As shown in FIG. 6, the detent means 80 comprise a non-rotatable detent member 82 which is positioned behind the front portion 76 of the carriage 66 and is formed with a plurality of angularly spaced detent notches 84 which face forwardly and are engagable by a plurality of rearwardly biased detent balls 86 received in rearwardly facing generally cylindrical wells 88 formed in the front portion 76 of the carriage 66. The detent balls 86 are pressed rearwardly against the detent member 82 by coil springs 90 received in the wells 88. Three of the detent balls 86 and springs 90 may be employed, but the number can be varied. The detent member 82 is preferably molded in one piece of a suitable resinous plastic material.

The shaft extension 78 on the carriage 66 is rotatable within an axial cylindrical opening 92 in the detent member 82 which is suitably held against rotation. As shown in FIGS. 5, 6, 21, 22 and 23, the detent member 82 is provided with a pair of outwardly projecting arms 94a and 94b which interlock with corresponding slots or notches 95a and 95b formed in a generally cylindrical member 96 projecting rearwardly from the front wall 28 of the casing 22. The arm 94a and the slot 95a are wider than the arm 94b and the slot 95b to insure that the detent member 82 will be oriented correctly in the casing 22.

As shown in FIGS. 5 and 6, a generally disk shaped cam 98 is solidly mounted on an axial non-circular portion 100 of the carriage 66, projecting rearwardly from the axial shaft extension 78. The cam 98 is preferably molded in one piece of a suitable resinous plastic material. The illustrated cam 98 has a hub portion 102 which is solidly mounted on the non-circular portion 100 of the carriage 66 and is secured to the carriage 66 by any suitable means, such as a press fit or resilient latching fingers (nat shown) on the carriage 66. The cam 98 is rotatable with the carriage 66.

As shown in FIG. 6, the detent member 82 is resiliently biased in a forward direction by a coil spring 104 received around the cylindrical shaft extension 78 on the carriage 66. The coil spring 104 is compressed between the rear side of the detent member 82 and the front side of the disk shaped cam 98. The force exerted by the spring 104 maintains the proper engagement between the detent balls 86 and the detent notches 84 in the detent member 82.

As shown in FIG. 6, an electrical contactor 106 is mounted on the disk shaped cam 98 and is rotatable therewith. The contactor 106 is generally in the form of a plate made of tin coated copper or some other electrically conductive material. The contactor 106 is connected to the disk shaped cam by resilient latching fingers or prongs 108 bent rearwardly from the contactor 106 and adapted to be slidably received in slots 110 formed in the disk shaped cam 98. Each of the fingers 108 is formed with a latching barb 112 which interlocks with the disk shaped cam 98 after the fingers 108 have been pushed in a forward direction through the slots 110. The illustrated contactor 106 is formed with two of the latching fingers 108. The contactor 106 is resiliently biased in a rearward direction by a coil spring 114 compressed between the contactor 106 and the disk shaped cam 98.

Figure 12:
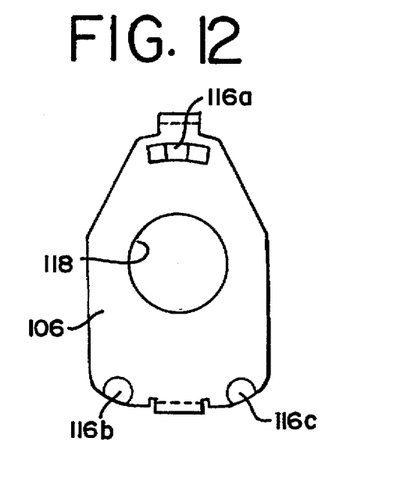
FIG. 12 is a rear elevational view of a rotatable electrical contactor employed in the switch.
Figure 13:
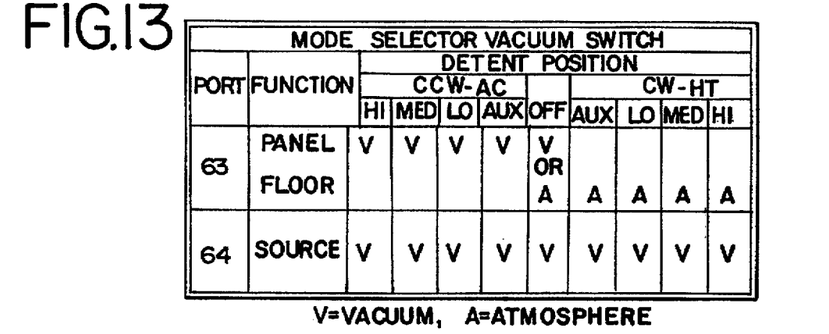
FIG. 13 is a table illustrating the operation of the vacuum valve portion of the switch.
Figure 14:
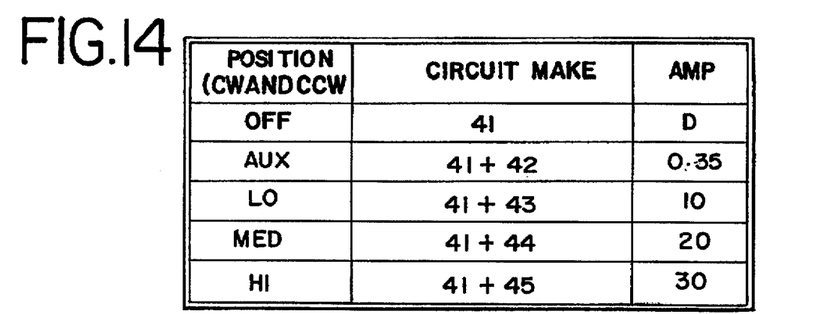
FIG. 14 is a table illustrating the operation of the electrical switch portion of the vacuum electric switch.
Figure 15:
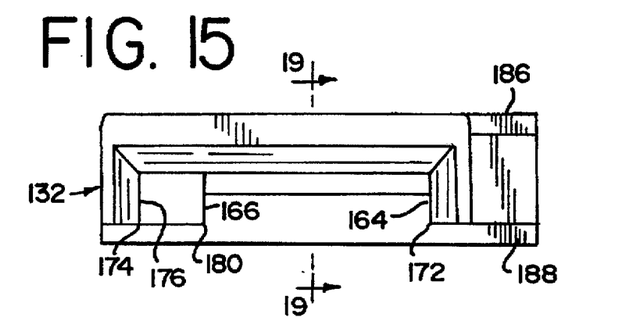
FIG. 15 is a front elevational view of the moveable valve member employed in the rotary vacuum electric switch.

As shown to best advantage in FIG. 12, and also in FIG. 6, the electrical contactor 106 is formed with first, second and third contactor points 116a, 116b and 116c which project rearwardly from the contactor 106 and are smoothly rounded with a generally spherical curvature. Preferably, the contactor points. 116a, 116b and 116c are struck rearwardly from the metal of the plate-like contactor 106.

Figure 7:
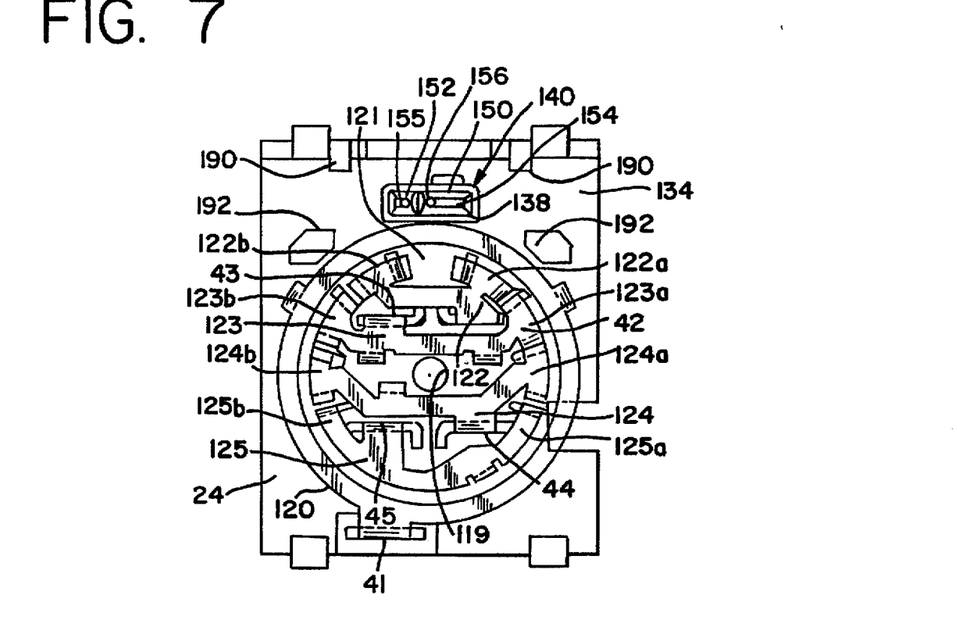
FIG. 7 is a front elevational view of the terminal head assembly for the switch, the terminal head assembly being shown in perspective in the left hand portion of FIG. 5.

The contactor 106 is rotatable with the carriage 66 and the disk shaped cam 98, around the rotary axis thereof. An axial stub shaft or journal 117 projects rearwardly on the shaft extension 78 of the carriage 66. The stub shaft 117 has a reduced diameter relative to the diameter of the shaft extension 78. As shown in FIGS. 6 and 12, the stub shaft 117 extends through a clearance opening 118 in the contactor 106 and is journaled in a blind opening 119 in the terminal head 24. The opening 119 is also shown in FIG. 7.

The second and third contactor points 116b and 116c are continuously in sliding engagement with a ring shaped fixed contact 120 securely mounted on the front of the terminal head 24 and preferably made of sheet metal, formed in one piece with the first electrical terminal 41 which projects rearwardly through the slot 51 in the terminal head 24. Thus, in all positions of the rotary control shaft 26, the contaCtor 106 is electrically connected to the ring shaped fixed contact 120 and the first electrical terminal 41.

Figure 1:
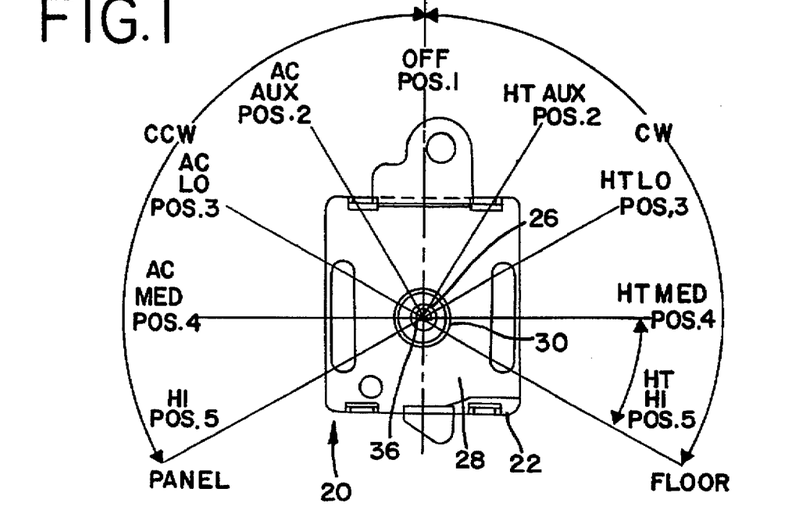
FIG. 1 is a front elevational view of a rotary vacuum electric switch to be described as an illustrative embodiment of the present invention.
Figure 2:
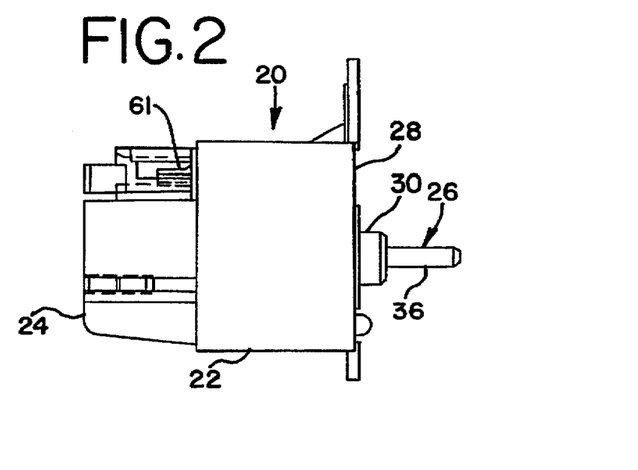
FIG. 2 is a left side elevational view of the switch.
Figure 3:
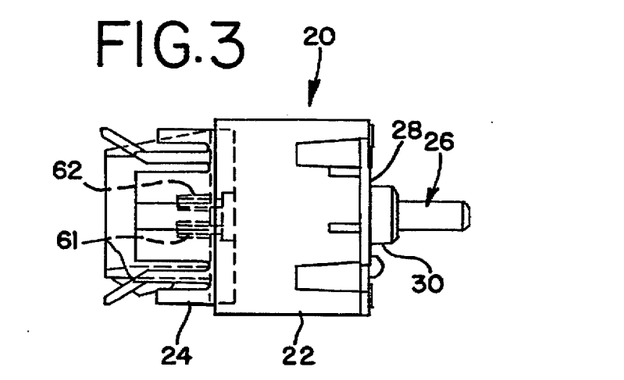
FIG. 3 is a top plan view of the switch.

As indicated in FIG. 1, the electrical contactor 106 has an OFF position at the center of its range of angular movement. The contactor 106 is moveable counterclockwise (CCW) to angularly spaced positions designated AC AUX, AC LO, AC MED and AC HI. The counterclockwise (CCW) positions represent the air conditioning (AC) control positions of the contactor 106.

Similarly, the contactor 106 is moveable clockwise (CW) from the OFF position to angularly spaced positions designated HT AUX, HT LO, HT MED and HT HI. The clockwise (CW) positions constitute heater (HT) control positions of the contactor 106.

In the OFF position, the first contactor point 116a, shown in FIG. 12, engages an electrically insulating portion or member 121 of the terminal head 24, as shown in FIG. 7. In the counterclockwise (CCW) AC AUX position, the first contactor point 116a engages a fixed contact 122b which is a portion of an electrically conductive AUX contact member 122, securely mounted on the terminal head 24. In the clockwise (CW) HT AUX position, the first contactor point 116a engages an HT AUX fixed contact 122a which is also a portion of the AUX contact member 122.

In the counterclockwise (CCW) AC LO position of the contactor 106, the first contactor point 116a engages a counterclockwise (CCW) AC LO fixed contact 123b which is a portion of an AC LO contact member 123, securely mounted on the front of the terminal head 24. In the clockwise (CW) HT LO position of the contactor 106, the first contactor point 116a engages a clockwise (CW) HT LO fixed contact 123a which is also a portion of the LO contact member 123.

In the counterclockwise (CCW) AC MED position of the contactor 106, the first contactor point 116a engages a counterclockwise (CCW) AC MED fixed contact 124b which is a portion of a MED contact member 124, secured to the front of the terminal head 24, and also formed with a clockwise (CW) HT MED fixed contact 124a which is engaged by the first contactor point 116a when the contactor 106 is in its clockwise (CW) HT MED position.

In the counterclockwise (CCW) AC HI position of the contactor 106, the first contactor point 116a engages a counterclockwise (CCW) AC HI fixed contact 125b which is a portion of a HI contact member 125 secured to the front of the terminal head 24. In the clockwise (CW) HT HI position of the contactor 106, the first contactor point 116a engages a clockwise (CW) HT HI fixed contact 125a which is also a portion of the HI contact member 125.

The respective external electrical terminals 42, 43, 44 and 45 are electrically connected to the respective contact members 122, 123, 124 and 125 and preferably are formed in one piece therewith. All of the contact members 122, 123, 124 and 125 are made of an electrically conductive material, preferably tin coated copper.

As shown in FIGS. 5 and 6, the rotary vacuum electric switch 20 comprises a vacuum switch or valve 130 which is operable by rotation of the control shaft 26, whereby the operation of the vacuum valve 130 is coordinated with the rotary movement of the electrical contactor 106 to its various electrical switching positions. The vacuum valve 130 is adapted to be operated by the disk shaped cam 98 Which is mounted on and rotatable with the carriage 66.

In some of the positions of the rotary control shaft 26, the vacuum valve 130 is operative to connect the vacuum utilization passage or port 63 to the vacuum source passage or port 64 in the respective vacuum terminals 61 and 62. In other positions of the shaft 26, the vacuum valve 130 is operative to connect the vacuum utilization passage or port 63 to a third port 131 while closing off the vacuum source passage 64. The third port communicates with the atmosphere in the illustrative switch 20.

More specifically, the vacuum valve 130 is operative to connect the vacuum utilization passage or port 63 to the vacuum source passage or port 64 in all of the counterclockwise (CCW) air conditioning (AC) control positions of the shaft 26, designated positions 2, 3, 4 and 5 in FIG. 1, and identified as AC AUX, AC LO, AC MED and AC HI. The vacuum valve 130 is operative to connect the vacuum utilization passage or port 63 to the third port 131 and thereby to the atmosphere, while closing off the vacuum source passage or port 64, in all of the clockwise (CW) heater (HT) control positions of the rotary shaft 26, designated positions 2, 3, 4 and 5 in FIG. 1 and identified as HT AUX, HT LO, HT MED and HT HI.

As shown in FIGS. 5, 6, 8 and 9, the vacuum switch or valve 130 preferably comprises a moveable valve member or port plate 132 which is slidably guided in a slideway 134, formed in a stationary valve member 136 formed as the front upper portion or member of the terminal head 24, as shown in FIGS. 5 and 6. The slideway 134 is formed with a recess 138 in which a soft resilient elastomeric sealing member 140 is snugly received. The moveable valve member 132 has a valve surface 142 which is slidable along the sealing member 140 and is in a slidable sealing engagement with the sealing member 140.

Figure 8:
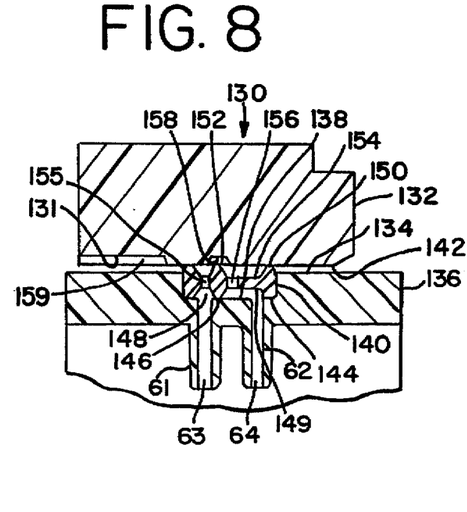
FIG. 8 is a fragmentary enlarged horizontal section taken through the vacuum valve portion of the switch, generally along the line 8—8 in FIG. 6, the valve being shown in its activated position.
Figure 9:
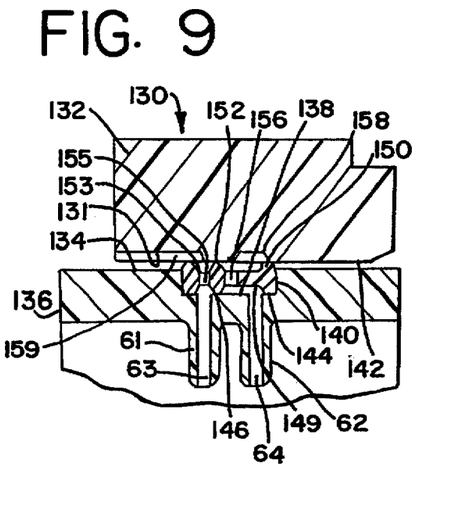
FIG. 9 is a sectional view similar to FIG. 8, but showing the valve in its OFF position.

Various details of the vacuum switch or valve 130 are shown in the enlarged fragmentary sections of FIGS. 8 and 9. The vacuum source passage or port 64 and the vacuum utilization passage or port 63 extend through the stationary valve member 136 and communicate with opposite end portions of the recess 138 therein. The soft resilient sealing member 140 is generally in the form of an elastomeric plate having a first perimeter flange 144 which engages and seals against the bottom of the recess 138. The sealing member 140 also has a first partition flange 146 which also engages and seals against the bottom of the recess 138. The first perimeter flange 144 and the first partition flange 146 constitute means forming a first vacuum utilization cavity 148 and a first vacuum source cavity 149 in the recess 138 and communicating respectively with the vacuum utilization passage or port 63 and the vacuum source passage or port 64.

The opposite side of the sealing member 140 is formed with a second perimeter flange 150 and a second partition flange 152, both of which are in a slidable sealing engagement with the valve surface 142 on the moveable valve member 132. The second perimeter flange 150 and the second partition flange 152 constitute means forming a second vacuum utilization cavity 153 and a second vacuum source cavity 154 between the sealing member 140 and the valve surface 142.

The sealing member 140 is formed with a vacuum utilization port 155 and a vacuum source port 156 extending through the sealing member 140. The vacuum utilization port 155 establishes communication between the first and second utilization cavities 148 and 153. Similarly, the vacuum source port 156 establishes communication between the first and second vacuum source cavities 149 and 154. Thus, in the ordinary use of the rotary vacuum electric switch 20, the second vacuum source cavity 154 is continuously supplied with vacuum, while the second vacuum utilization cavity 154 is continuously connected to the vacuum utilization device which may be employed for moving a door in the air duct system of the vehicle.

The valve surface 142 of the moveable valve member 132 is formed with port structure or means for selectively connecting the vacuum utilization port 155 to either the vacuum source port 156 or the third port 131, while also closing off the vacuum source port 156. The third port 131 communicates with the atmosphere in this instance. As shown in FIGS. 8 and 9, the port means are illustrated as comprising first and second channel shaped ports or grooves 158 and 159 formed in the valve surface 142. The first channel shaped port 158 is relatively short and is never in communication with the atmosphere. The third port 131 is illustrated as an extension of the second channel shaped port 159 and is relatively long and continuously in communication with the atmosphere. The third port 131 extends from the left hand end of the channel shaped groove 159 as shown in FIGS. 8 and 9. The valve member 132 is moveable by the rotatable cam 98 between the first or ON position of FIG. 8 and the second or OFF position of FIG. 9. In the first or ON position of FIG. 8, the first channel shaped port 158 spans across the second partition flange 152 and establishes communication between the second vacuum utilization cavity 153 and the second vacuum source cavity 154, whereby the vacuum utilization port 155 is in communication with the vacuum source port 156, so that the vacuum utilization device is energized.

When the moveable valve member 132 is shifted to its second or OFF position of FIG. 9, the entire length of the first channel shaped port 158 is opposite the second vacuum source cavity, whereby the vacuum source port 156 and the vacuum source passage or port 64 are closed off. The second channel shaped port 159 establishes communication between the second vacuum utilization cavity 153 and the third port 131 which communicated with the atmosphere, so that the vacuum utilization port 155 and the vacuum utilization passage or port 63 are connected to the atmosphere, whereby the vacuum utilization device is de-energized.

Figure 10:
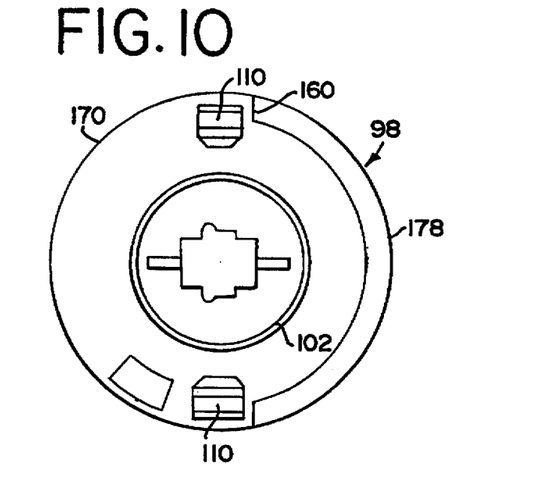
FIG. 10 is an elevational view of a rotatable cam employed in the switch operation the vacuum valve.
Figure 11:
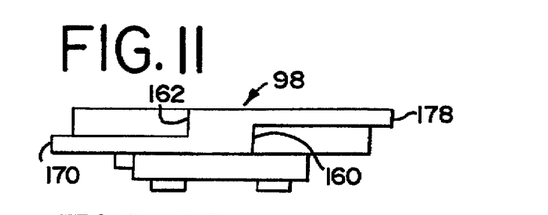
FIG. 11 is a plan view of the cam of FIG. 10.

As previously described and as illustrated in FIGS. 5 and 6, the disk shaped cam 98 is mounted on and is rotatable with the carriage 66 and the control shaft 26. The electrical contactor 106 is mounted on the cam 98 and is rotatable therewith. The orientation of the contactor 106 relative to the cam 98 is the same as shown in FIGS. 10, 11 and 12. When the contactor 106 is moved counterclockwise (CCW) from its OFF position to its AC AUX position, as identified in FIG. 1, the cam 98 is operative to shift the moveable valve member 132 from its second or OFF position of FIG. 9 to its first or ON position of FIG. 8. The moveable valve member 132 is locked in its first or ON position when the contactor 106 is moved farther in a counterclockwise (CCW) direction to its positions designated AC LO, AC MED and AC HI in FIG. 1. Moreover, the moveable valve member 132 remains in its first or ON position when the electrical contactor 106 is returned in a clockwise (CW) direction to its OFF position as designated in FIG. 1.

When the electrical contactor is moved in a clockwise (CW) direction from its OFF position to its HT AUX position, as designated in FIG. 1, the disk shaped cam 98 is operative to shift the moveable valve member 132 from its first or ON position of FIG. 8 to its second or OFF position of FIG. 9. For the second or OFF position of the moveable valve member 132, the vacuum utilization passage or port 63 is connected to the third port 131 and thereby to the atmosphere, while the vacuum source passage or port 64 is closed off. For the first or ON position of FIG. 8, the vacuum utilization passage or port 63 is connected to the vacuum source passage or port 64, rather than to the atmosphere.

When the contactor 106 is moved farther clockwise (CW) to the positions designated HT LO, HT MED and HT HI in FIG. 1, the moveable valve member 132 is locked in its second or OFF position of FIG. 9. The moveable valve member 132 remains in its second or OFF position when the contactor 106 is returned to its OFF position of FIG. 1.

The disk shaped cam 98 comprises means for shifting the moveable valve member 132 between its OFF and ON positions in response to the rotation of the cam 98, along with the contactor 106, to the various positions thereof. Such means are illustrated in FIGS. 10 and 11 as comprising first and second generally radial shoulders 160 and 162 on the opposite sides of the cam 98. As shown, the first shoulder 160 is on the front side of the cam 98 and is formed to face clockwise for shifting the moveable valve member 132 from its first or ON position to its second or OFF position. The second shoulder 162 is on the rear side of the cam 98 and is formed to face counterclockwise, for shifting the moveable valve member 132 between its second or OFF position and its first or ON position.

Figure 16:
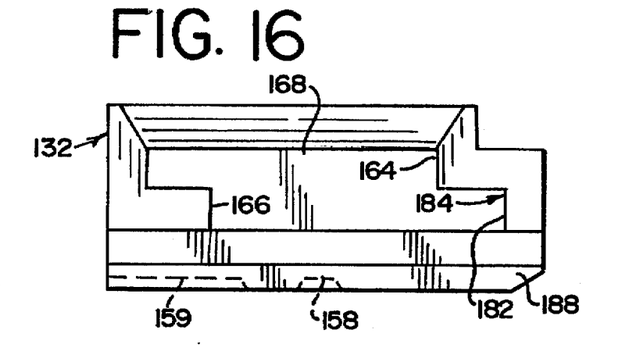
FIG. 16 is a bottom plan view showing the lower side of the moveable valve member.
Figure 17:
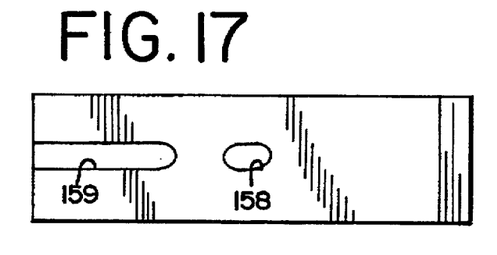
FIG. 17 is a rear elevational view of the valve member.
Figure 18:
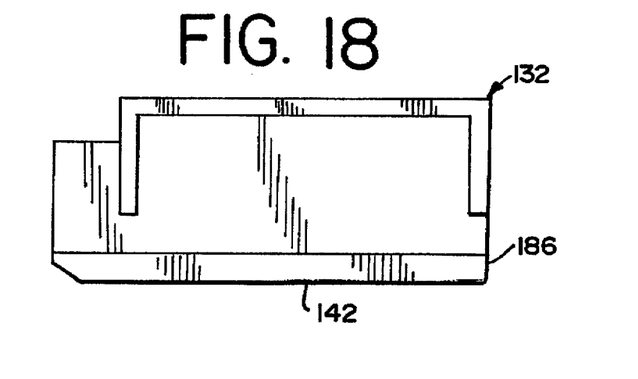
FIG. 18 is a top plan view showing the upper side of the valve member.
Figure 19:
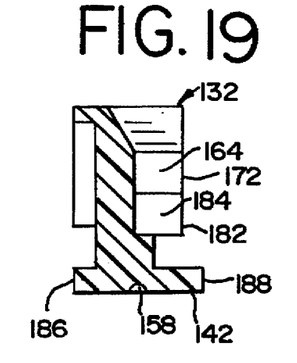
FIG. 19 is a sectional view taken through the valve member, generally along the line 19—19 in FIG. 15.
Figure 20:
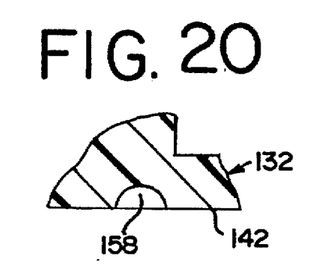
FIG. 20 is a greatly enlarged sectional view corresponding to a portion of FIG. 19 and showing a port detail.

As shown in FIG. 16, the underside of the moveable valve member 132 is formed with a first shoulder or step 164 which is engagable by the first radial shoulder 160 on the cam 98 when the cam is rotated clockwise from its second or OFF position to its HT AUX position, whereby the moveable valve member 132 is shifted to its OFF position. The underside of the moveable valve member 132 is also formed with a second shoulder or step 166 which is engagable by the second radial shoulder 162 on the cam 98 when the cam is rotated counterclockwise between its OFF position and its AC AUX position, whereby the moveable valve member 132 is shifted from its second or OFF position to its first or ON position. It will be seen in FIG. 16 that the shoulder or step 164 faces to the left, while the shoulder or step 166 faces to the right. The shoulders 164 and 166 extend downwardly from a lower surface 168 on the moveable valve member 132.

When the cam 98 is rotated past its HT AUX position, the first radial shoulder 160 on the cam 98 escapes from the first shoulder or step 164 on the moveable valve member 132. However, the cam 98 comprises additional means for locking or holding the moveable valve member 132 in its OFF position when the cam 98 is in its HT AUX position and when the cam 98 is rotated farther in a clockwise direction to its HT HI position and for all positions between its HT AUX and its HT HI positions. As shown in FIGS. 10 and 11, such means comprise a first circularly curved peripheral portion or member 170 extending in a counterclockwise direction from the first radial shoulder 160 for somewhat more than 180 degrees. The first circularly curved member 170 is slidably engagable with the lower extremity or corner 172 of the first shoulder or step 164 and also with the lower extremity or corner 174 of an oppositely facing shoulder or step 176 formed on the moveable valve member 132 so as to be spaced from and facing toward the first shoulder or step 164. The presence of the first circularly curved peripheral portion 170 of the cam 98 between the lower extremities 172 and 174 locks or holds the moveable valve member 132 in its second or OFF position for all positions of the cam 98 between and including its HT AUX position and its HT HI position.

Similarly, when the cam 98 is moved counterclockwise from its OFF position, the second radial shoulder 162 escapes from the second shoulder or step 166 on the moveable valve member 132 when the second radial shoulder 162 passes its AC AUX position, but the cam 98 comprises additional means for holding or locking the moveable valve member 132 in its first or ON position for all positions of the cam 98 between and including its AC AUX and its AC HI positions. As shown in FIGS. 10 and 11, such means comprise a second circularly curved peripheral portion or member 178 extending clockwise from the second radial shoulder 162 for approximately 180 degrees. The second circularly curved peripheral portion 178 is slidably engagable with the lower extremity or corner 180 of the second shoulder or step 166 and also with the lower extremity or corner 182 of another shoulder or step 184 spaced from and facing toward the second shoulder or step 166 on the moveable valve member 132. The presence of the second circularly curved peripheral portion 178 between the lower extremities 180 and 182 locks or holds the moveable valve member 132 in its first or ON position for all positions of the cam 98 between and including its AC AUX and its AC HI positions. The locking action of the first and second circularly curved peripheral portions 170 and 178 of the cam 98 ensures that the position of the moveable valve member 132 will not be changed or disturbed by shock or vibration.

The moveable valve member 132 is suitably retained and guided for its sliding movement along the slideway 134. As previously described and as shown to best advantage in FIG. 6, the flat longitudinal valve surface 142 of the moveable valve member or port plate 132 is slidably and sealingly engaged with the soft resilient sealing member 140 which is snugly received in the recess 138 formed in the slideway 134 on the stationary valve member 136. As shown in FIGS. 6 and 15–19, the moveable valve member or port plate 132 has upper and lower longitudinal flanges 186 and 188 extending along its longitudinal extremities. The illustrated flanges 186 and 188 are generally rectangular in cross section, as shown to best advantage in FIG. 19. As shown to best advantage in FIG. 7, the stationary valve member 136 of the terminal head 24 is formed with a pair of upper retaining lugs or tabs 190 and a pair of lower retaining lugs or tabs 192 for embracing the upper and lower longitudinal flanges 186 and 188 on the moveable valve member 132 whereby the moveable valve member 132 is retained in its slidable relation with the slideway 134 and the soft resilient sealing member 140. The upper and lower retaining lugs 190 and 192 are dimensioned so that the valve surface 142 exerts a sealing force against the sealing member 140, whereby the soft resilient sealing member 140 is compressed sufficiently to ensure that sealing pressure is maintained between the sealing member 140 and the valve surface 142 throughout the range of longitudinal movement of the moveable valve member 132. The moveable valve member 132 is easily assembled with the slideway 134 by sliding the upper and lower longitudinal flanges 186 and 188 behind the upper and lower retaining lugs 190 and 192.

Figure 21:
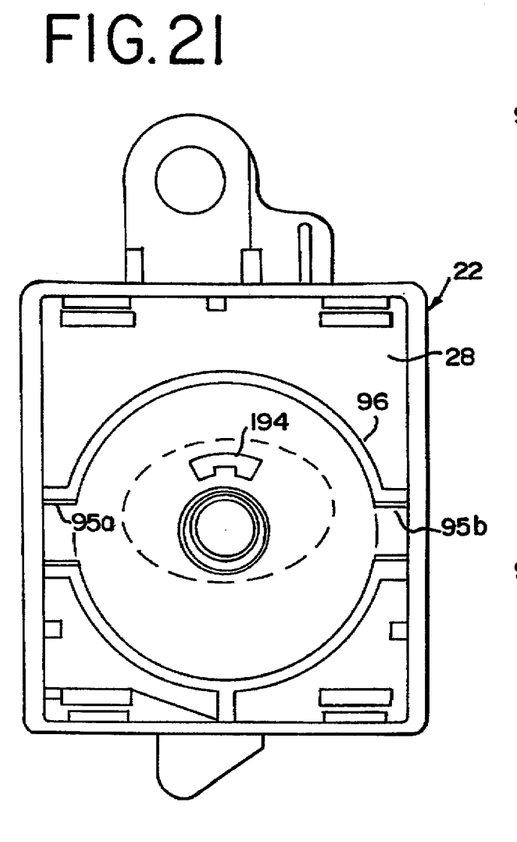
FIG. 21 is a rear elevational view of the casing for the vacuum electric switch.
Figure 22:
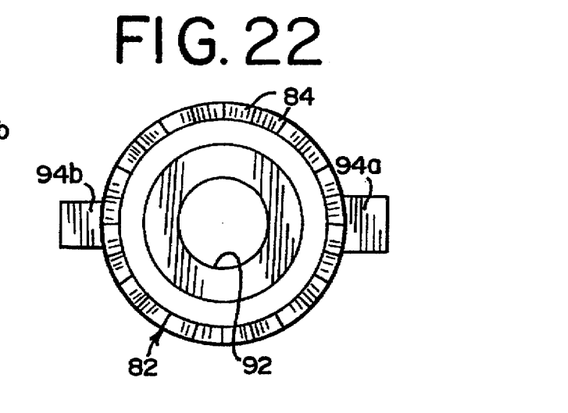
FIG. 22 is a rear elevational view of the detent member for the vacuum electric switch.
Figure 23:
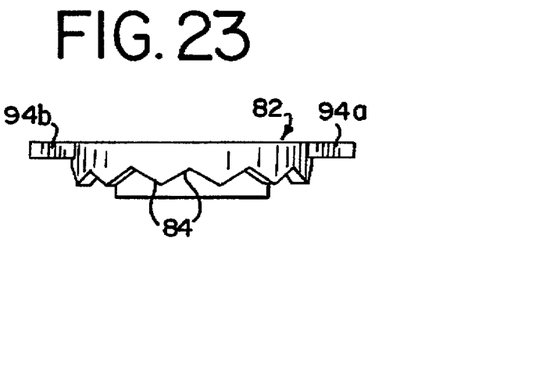
FIG. 23 is a top plan view of the detent member.

As previously described and as illustrated in FIG. 1, the rotary control shaft 26 is rotatable between the extreme positions designated HT HI and AC HI. As shown, the range of rotation is approximately 240 degrees. The rotary vacuum electric switch 20 is provided with stop means for limiting the range of rotation of the shaft 26 and the various components which are rotatable with the shaft 26. These components include the carriage 66, the disk shaped cam 98 and the electrical contactor 106. As illustrated in FIG. 21, the stop means comprise a stop lug 194 which projects rearwardly into the hollow casing 22 from the rear side of the front wall 28 thereof. The stop lug 194 is preferably molded in one piece with the casing 22. The stop lug 194 is received in an arcuate groove or channel 196, formed in the front of the rotatable carriage 66. The angular extent of the stop groove 196 determines the limits of the range of rotation of the carriage 66 and the shaft 26. The arcuate stop groove 196 is also shown in the perspective view of the carriage 66 in FIG. 5.

Figure 4:
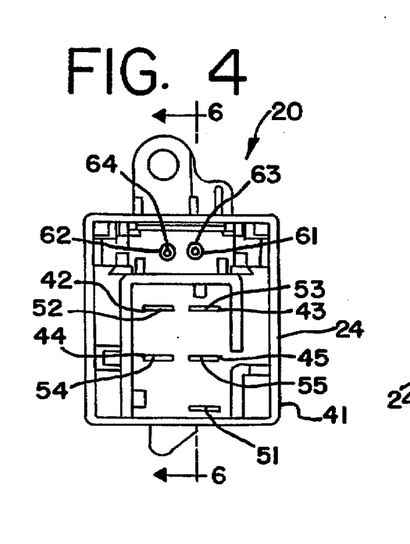
FIG. 4 is a rear elevational view of the switch

In the operation of the rotary vacuum electric switch 20, the first electrical terminal 41 of FIGS. 4 and 7 is adapted to be connected to the ungrounded terminal of the storage battery in the vehicle so that the terminal 41 is supplied with battery voltage at all times. The ring shaped fixed contact 120 is connected to the terminal 41 and is slidably engaged by the contactor points 116b and 116c on the contactor 106, so that the contactor 106 is supplied with battery voltage at all times. In the OFF position of the contactor 106, the contactor point 116a engages the electrically insulating portion 121 on the terminal head 24, so that no circuit is energized.

The contactor 106 is selectively rotatable in a counter-clockwise (CCW) direction to its successive detented air conditioning positions designated AC AUX, AC LO, AC MED and AC HI in FIG. 1. In the successive positions, the contactor point 116a engages the successive fixed contacts 122b, 123b, 124b and 125b, which are connected to or formed in one piece with the respective electrical terminals 42, 43, 44 and 45 of FIGS. 4 and 7, so that the successive electrical terminals are energized with battery voltage.

When the contactor 106 is rotated clockwise (CW) to its successive heater positions designated HT AUX, HT LO, HT MED and HT HI in FIG. 1, the contactor point 116a successively engages the fixed contacts 122a, 123a, 124a and 125a, which are thereby supplied with battery voltage. The successive fixed contacts 122a, 123a, 124a and 125a are connected to or formed in one piece with the successive electrical terminals 42, 43, 44 and 45 of FIGS. 4 and 7, so that the respective electrical terminals are successively energized with battery voltage.

The operation of the vacuum valve or switch 130 is coordinated with the rotation of the contactor 106 by the cam 98 on which the contactor 106 is mounted. When the contactor 106 is moved counterclockwise (CCW) from its OFF position to its AC AUX position, the shoulder 162 on the cam 98 pushes the moveable valve member 132 from its second or OFF position of FIG. 9 to its first or ON position of FIG. 8 so that the vacuum utilization passage or port 63 is supplied with vacuum from the vacuum source passage or port 64 by the channel shaped port 158 in the moveable valve member 132, as described in greater detail previously herein. In the AC AUX and all of the other counterclockwise (CCW) air conditioning positions AC LO, AC MED and AC HI of the cam 98, the moveable valve member 132 is retained or locked in its first or ON position of FIG. 8 by the generally circular portion 178 of the cam 98, as described in greater detail previously herein.

When the contactor 106 and the cam 98 are rotated clockwise (CW) from their OFF position to their heater position HT AUX of FIG. 1, the moveable valve member 132 is pushed from its first or ON position of FIG. 8 to its second or OFF position of FIG. 9 by the shoulder 160 on the cam 98, so that the vacuum utilization passage or port 63 is connected to the third port 131 and thence to the atmosphere by the channel shaped port 159, while the vacuum source passage or port 64 is closed off by the positioning of the channel shaped port 158 as shown in FIG. 9 and as described in greater detail previously herein. In the HT AUX and all of the other clockwise (CW) heater positions HT LO, HT MED and HT HI, the moveable valve member 132 is retained or locked in its second or OFF position by the generally circular portion 170 of the cam 98, as described in greater detail previously herein.

The illustrated rotary vacuum electric switch 20 has nine positions, including an OFF position and eight circuit closing positions. However, the number of positions can easily be changed by omitting one or more circuit closing positions, or by providing one or more additional circuit closing positions.

The vacuum valve 130 has one vacuum source terminal and one vacuum utilization terminal. However, one or more additional vacuum conducting terminals can easily be provided by adding the necessary port and passage structures and by modifying the stationary sealing member 140.

The illustrated moveable valve member 132 has only one OFF position and one ON position. However, additional positions can be provided by adding the necessary port and passage structure and by modifying the stationary sealing member 140.

Various other modifications, alternative constructions and equivalents may be provided without departing from the true spirit and scope of the present invention, as disclosed herein and as set forth in the following claims.

We claim:

1. A vacuum switch, comprising a casing having a casing member, means forming a slideway on said casing member, said slideway having a recess therein, a vacuum passage and at least one utilization passage formed in said casing member and connecting with said recess, a soft resilient sealing member received in said recess and having a vacuum port in communication with said vacuum passage, said sealing member having at least one utilization port communicating with said at least one utilization passage, a moveable valve member slidably received on said slideway and having a valve surface in a slidable sealing engagement with said sealing member, means forming a third port, said moveable valve member being moveable between at least first and second positions, and port means in said valve surface for connecting said at least one utilization port to said vacuum port when said moveable valve member is in said first position while connecting said at least one utilization port to said third port when said moveable valve member is in said second position, said vacuum switch including a shaft rotatably received in said casing, and a cam rotatable with said shaft between at least first and second angular positions for causing movement of said moveable valve member between said first and second positions, said cam comprising a first generally radial shoulder for causing movement of said moveable valve member between said first and second positions when said cam is rotated between said first and second angular positions, said cam comprising a second generally radial shoulder for causing movement of said moveable valve member between said second and first positions when said cam is rotated between said second and first angular positions, said vacuum switch including means in said casing for supporting said shaft and said cam for rotation in opposite angular directions beyond said first and second angular positions, said cam comprising generally circular means for locking said moveable valve member when said cam is in said first angular position and also when said cam is rotated beyond said first angular position, said cam comprising generally circular means for locking said moveable valve member when said cam is in said second angular position and also when said cam is rotated beyond said second angular position.

2. A vacuum switch according to claim 1, including means for connecting said third port with the atmosphere.

3. An automotive vacuum electric switch, comprising a casing, a shaft rotatable in said casing, an insulating carriage mounted on said shaft and rotatable therewith, an electrically conductive contactor mounted on said carriage and rotatable therewith to a series of angularly spaced switching positions including an OFF position and a series of circuit closing positions, said casing having an insulating terminal head mounted on said casing opposite said contactor, said contactor having at least first and second moveable contacts secured thereto for slidably engaging said terminal head, said terminal head having an insulating OFF portion engagable by said first moveable contact in said OFF position of said contactor, a plurality of fixed contacts mounted on said terminal head and engagable by said moveable contacts at said circuit closing positions of said contactor, a vacuum valve including a stationary valve member mounted on said casing and having at least a vacuum source port and a vacuum utilization port therein, said stationary valve member having a slideway thereon, a soft resilient sealing member mounted on said stationary valve member along said slideway, a moveable valve member slidable along said slideway and having a valve surface for slidably engaging said sealing member, said moveable valve member being slidably moveable to at least first and second positions, means forming a third port, said sealing member and said valve surface having port means therein for connecting said utilization port to said vacuum source port in said first position of said moveable valve member and for connecting said utilization port to said third port in said second position of said moveable valve member, and a valve actuating cam on said carriage and rotatable with said carriage and said contactor, said cam having valve operating means thereon for causing movement of said moveable valve member in opposite directions between said first and second positions thereof in response to rotation of said cam and said contactor between said OFF position of said contactor and said switch closing positions thereof in opposite directions of rotation, said cam including additional means for retaining said moveable valve member in said first and second positions thereof for selected positions of said contactor, said valve operating means comprising oppositely facing generally radial shoulders on said cam for engaging and causing movement of said moveable valve member in opposite directions, said additional means comprising circularly curved portions of said cam for retaining said moveable valve member in said first and second positions thereof for selected positions of said contactor.

4. An automotive vacuum electric switch according to claim 3, including means for connecting said third port with the atmosphere.

5. A vacuum valve, comprising a casing including a stationary valve member having a slideway thereon, said stationary valve member having at least a vacuum source port and a vacuum utilization port spaced therein along said slideway, a moveable valve member having a valve surface moveable along said slideway, said moveable valve member being slidably moveable to at least first and second positions, said moveable valve surface having port means therein for connecting said utilization port to said vacuum source port in said first position of said moveable valve member and for disconnecting said utilization port from said source port in said second position of said moveable valve member, and a rotatable valve actuating cam rotatably mounted on said casing, said cam having valve operating means thereon for causing movement of said moveable valve member in opposite directions between said first and second positions thereof in response to rotation of said cam in opposite directions of rotation, said cam including additional means for retaining said moveable valve member in said first and second positions thereof for selected positions of said cam, said valve operating means comprising oppositely facing shoulders on said cam for engaging and causing said movement of said moveable valve member in said opposite directions, said additional means comprising circularly curved portions of said cam for retaining said moveable valve member in said first and second positions thereof for selected positions of said cam.

6. A vacuum valve according to claim 5, in which said pot means include means for connecting said utilization port to the atmosphere in said second position of said moveable valve member.

7. A vacuum valve according to claim 5, including means for forming a third port, said port means in said moveable valve surface including means for connecting said utilization port to said third port in said second position of said moveable valve member.

8. A vacuum valve according to claim 7, including means for connecting said third port to the atmosphere.

9. A vacuum valve according to claim 5, in which said oppositely facing shoulders on said cam are generally radial thereon.

10. A vacuum valve according to claim 5, in which said cam is rotatable on said casing between at least first and second angular positions for causing movement of said moveable valve member between said first and second positions thereof, said casing comprising means supporting said cam for rotation in opposite angular directions beyond said first and second angular positions, said circularly curved portions of said cam comprising circularly curved means for locking said moveable valve member in said first position thereof when said cam is in said first angular position and also when said cam is rotated beyond said first angular position, said circularly curved portions of said cam comprising additional circularly curved means for locking said moveable valve member in said second position thereof when said cam is in said second angular position and also when said cam is rotated beyond said second angular position.

11. A vacuum valve, comprising a casing having a casing member, means forming a slideway on said casing member, a vacuum passage and at least one utilization passage formed in said casing member, means in said slideway forming a vacuum port in communication with said vacuum passage and at least one utilization port communicating with said utilization passage, a moveable valve member having a valve surface slidably received on said slideway, means forming a third port, said moveable valve member being moveable between at least first and second positions, port means in said valve surface for connecting said utilization port to said vacuum port when said moveable valve member is in said first position while connecting said utilization port to said third port when said moveable valve member is in said second position, a shaft rotatably received in said casing, and a cam rotatable with said shaft between at least first and second angular positions for causing movement of said moveable valve member between said first and second positions, said cam comprising first means for causing movement of said moveable valve member between said first and second positions when said cam is rotated between said first and second angular positions, said cam comprising second means for causing movement of said moveable valve member between said second and first positions when said cam is rotated between said second and first angular positions, said casing including means for supporting said shaft and said cam for rotation in opposite angular directions beyond said first and second angular positions, said cam comprising generally circular means for locking said moveable valve member when said cam is in said first angular position and also when said cam is rotated beyond said first angular position, said cam comprising generally circular means for locking said moveable valve member when said cam is in said second angular position and also when said cam is rotated beyond said second angular position.

12. A vacuum valve according to claim 11, including means for connecting said third port to the atmosphere.

13. A vacuum valve according to claim 11, in which said first and second means of said cam comprise first and second oppositely facing shoulders which are spaced apart on said cam for causing said movement of said moveable valve member.

14. A vacuum valve according to claim 11, in which said first and second means of said cam comprise first and second oppositely facing generally radial shoulders which are spaced apart on said cam for causing said movement of said moveable valve member.

15. A vacuum valve, comprising a casing having a stationary casing member, means forming a slideway on said casing member, said slideway having a recess therein, a soft resilient sealing member received and retained in a stationary position in said recess, said sealing member having a vacuum port and at least one utilization port extending through said sealing member and spaced along said slideway, said casing member having a vacuum passage and at least one utilization passage extending into said recess and communicating with said respective vacuum port and said at least one utilization port in said sealing member, a moveable valve member having a valve surface slidably engaging said sealing member and moveable along said sealing member and said slideway, said valve surface being in a slidable sealing engagement with said stationary sealing member, means movably mounted on said casing for moving said moveable valve member relative to said stationary sealing member between at least first and second positions, means forming a third port, and port means in said valve surface for connecting said at least one utilization port to said vacuum port when said moveable valve member is in said first position while connecting said at least one utilization port to said third port when said moveable valve member is in said second position.

16. A vacuum valve according to claim 15, including means for connecting said third port to the atmosphere.

* * * * *